(12) United States Patent
Papple et al.

(10) Patent No.: US 9,638,046 B2
(45) Date of Patent: May 2, 2017

(54) AIRFOIL WITH VARIABLE LAND WIDTH AT TRAILING EDGE

(71) Applicant: Pratt & Whitney Canada Corp., Longueuil (CA)

(72) Inventors: Michael Papple, Verdun (CA); Ghislain Plante, Verdun (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 384 days.

(21) Appl. No.: 14/302,586

(22) Filed: Jun. 12, 2014

(65) Prior Publication Data
US 2015/0361800 A1    Dec. 17, 2015

(51) Int. Cl.
*F01D 5/18*    (2006.01)

(52) U.S. Cl.
CPC .............. *F01D 5/187* (2013.01); *F01D 5/186* (2013.01); *F05D 2240/304* (2013.01); *F05D 2260/202* (2013.01)

(58) Field of Classification Search
CPC .................................. F01D 5/186; F01D 5/187
See application file for complete search history.

(56) References Cited

U.S. PATENT DOCUMENTS

| | | | |
|---|---|---|---|
| 6,234,754 B1 | 5/2001 | Zelesky et al. | |
| 6,609,891 B2 | 8/2003 | Leeke et al. | |
| 7,165,940 B2 | 1/2007 | McGrath et al. | |
| 7,503,749 B2 | 3/2009 | Lee et al. | |
| 7,850,428 B2 | 12/2010 | Tibbott et al. | |
| 2013/0302177 A1* | 11/2013 | Bergholz, Jr. | F01D 5/187 416/97 R |

* cited by examiner

*Primary Examiner* — John K Fristoe, Jr.
*Assistant Examiner* — John Hunter
(74) *Attorney, Agent, or Firm* — Norton Rose Fulbright Canada LLP

(57) ABSTRACT

An internally cooled airfoil, such as a turbine blade, has an airfoil section extending between a tip and a root. The interior of the airfoil includes a distribution of lands at the trailing edge in the span direction. A width of each of the lands is a widest dimension in the span direction of the land in the interior of the airfoil. A pitch is a distance in the span direction between centerlines of two adjacent lands. The pitch is constant throughout the distribution of the lands. The distribution of the lands includes at least two different widths.

20 Claims, 4 Drawing Sheets

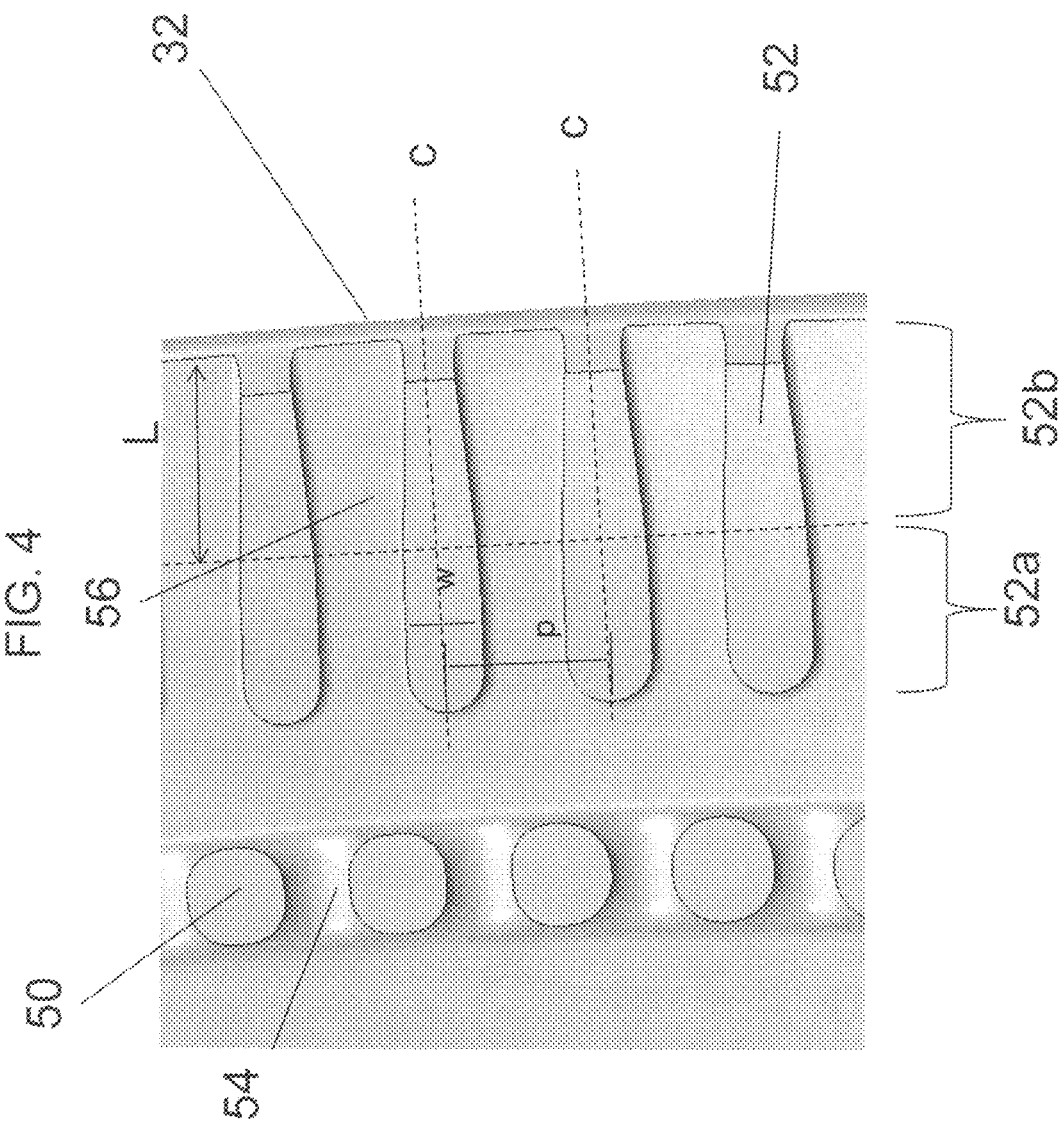

US 9,638,046 B2

AIRFOIL WITH VARIABLE LAND WIDTH AT TRAILING EDGE

TECHNICAL FIELD

The application relates generally to gas turbine engines and, more particularly, to cooling of airfoils.

BACKGROUND OF THE ART

A gas turbine engine includes a combustor in which compressed air is mixed with fuel and ignited for generating an annular stream of hot combustion gases, and a turbine section disposed downstream of the combustor which extracts energy from the combustion gases. The turbine section may be formed of a plurality of rotors including radially extending blades. The blades are in contact with the hot gases and may suffer over time by the high temperatures of the hot gases.

SUMMARY

In one aspect, there is provided an internally cooled airfoil for a gas turbine engine, comprising: an airfoil section extending in a span direction between a tip and a root, the airfoil section having: a leading edge and an opposed trailing edge defining a chord direction; a pressure side and an opposed suction side, the pressure side and the suction side extending between the leading edge and the trailing edge, the pressure side and suction side defining a hollow interior of the airfoil, a plurality of trailing edge slots distributed along the spanwise direction, the trailing edge slot being in flow communication with the hollow interior of the airfoil, the trailing edge slots being spaced by lands, a width of each of the lands being a widest dimension in the span direction of the land, a pitch being a distance in the span direction between centerlines of two adjacent lands, the pitch being constant throughout the lands, the distribution of the lands including at least two different widths.

In another aspect, there is provided a turbine blade for a gas turbine engine, the blade comprising: an airfoil extending from a platform to a tip along a span direction, the airfoil having: a leading edge and an opposed trailing edge defining a chord direction; a pressure side and an opposed suction side, the pressure side and the suction side extending between the leading edge and the trailing edge, the pressure side and suction side defining a hollow interior of the airfoil, a row of trailing edge slots distributed along the span direction of the airfoil, the trailing edge slots communicating with the hollow interior of the airfoil, wherein adjacent trailing edge slots are separated by lands, a width of each of the lands being a widest dimension in the span direction of the land, a pitch being a distance in the span direction between centerlines of two adjacent lands, the pitch being constant throughout the distribution of the lands, the distribution of the lands including at least two different widths.

DESCRIPTION OF THE DRAWINGS

Reference is now made to the accompanying figures in which:

FIG. 4 is a close-up view of FIG. 2 showing a portion of a trailing edge of the blade of FIG. 2.

DETAILED DESCRIPTION

Figure 1:
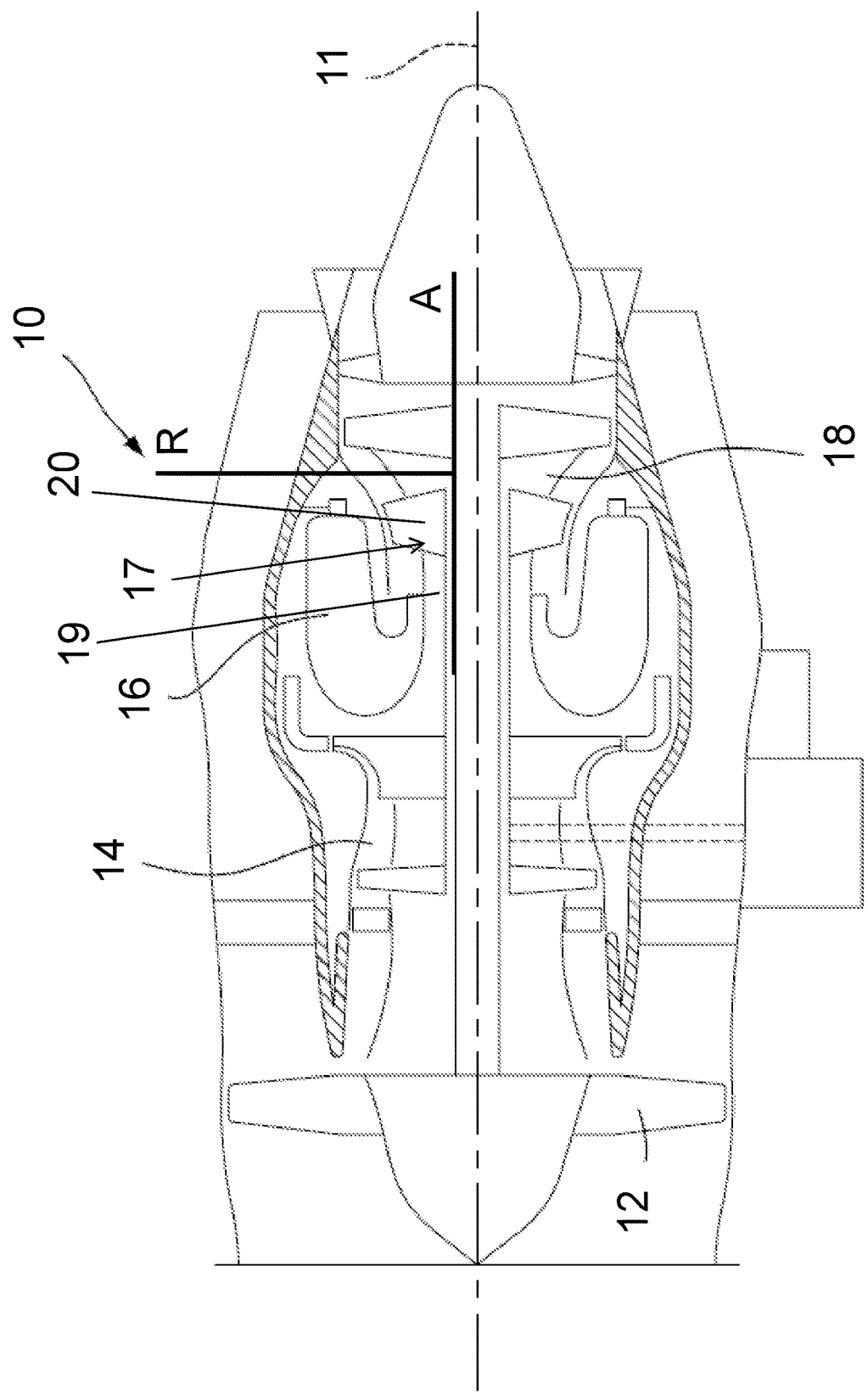
FIG. 1 is a schematic cross-sectional view of a gas turbine engine.

FIG. 1 illustrates a gas turbine engine 10 of a type preferably provided for use in subsonic flight, generally comprising in serial flow communication along a centerline 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 includes a high power turbine 17 having a plurality of rotors. The rotors rotate with a turbine shaft 19 linked to the compressor section 14. The turbine shaft 19 defines an axial direction A in the direction of the engine axis 11, and a radial direction R in a direction perpendicular to the engine axis 11. The high power turbine 17 is in contact with the hot gas exhausted by the combustor 16, and blades 20 of the rotors are exposed to high temperatures. The blades 20 are shaped to internally receive a coolant (e.g. bleed air from compressor 14) to counter possible side effects of exposing the blades 20 to the high temperatures of the exhaust gases. Side effects may include added stresses to the blades 20 and possible cracks in the blades 20.

Figure 2:
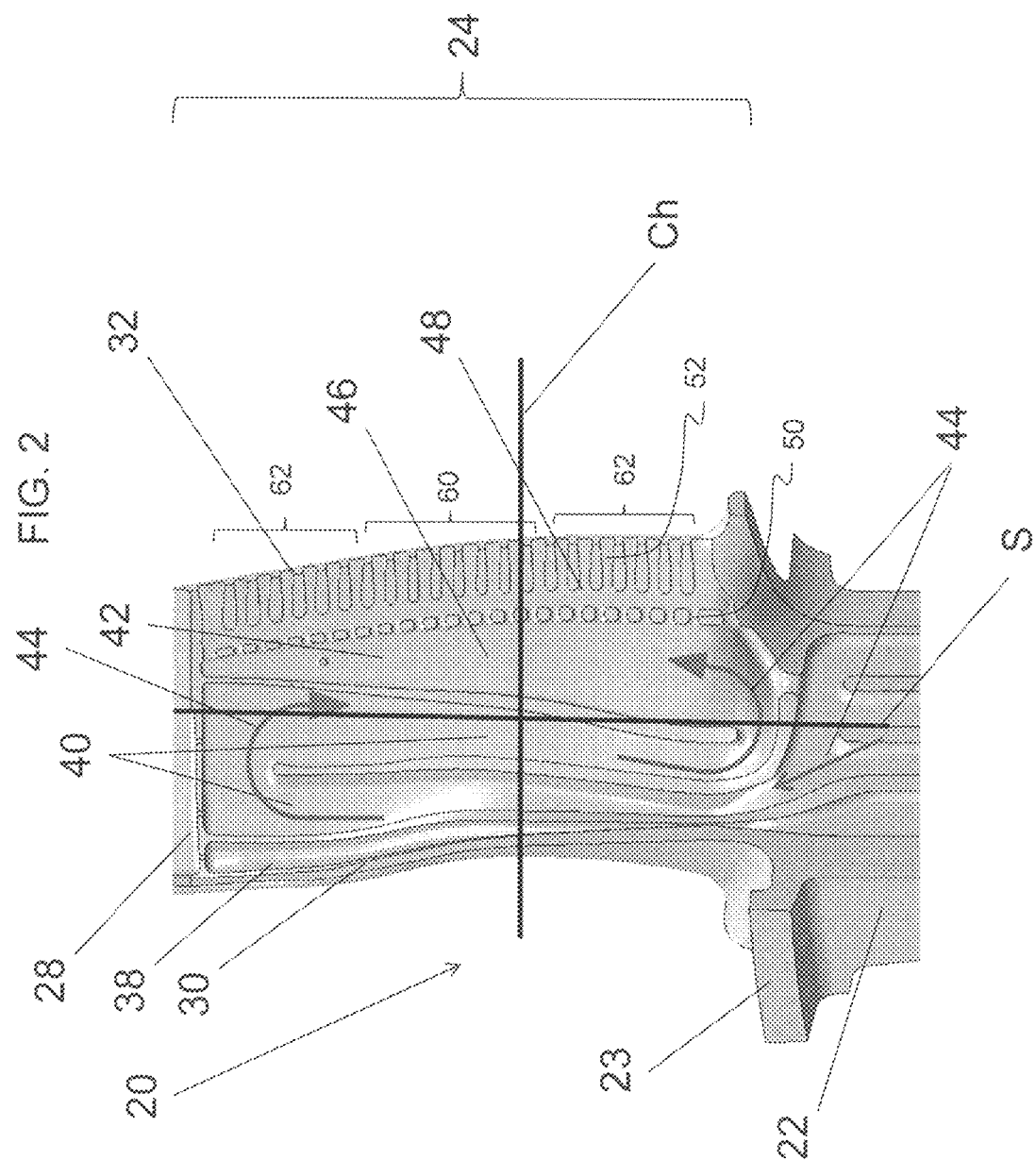
FIG. 2 is a schematic cross-sectional view of a blade of a turbine rotor of the gas turbine engine of FIG. 1.
Figure 3:
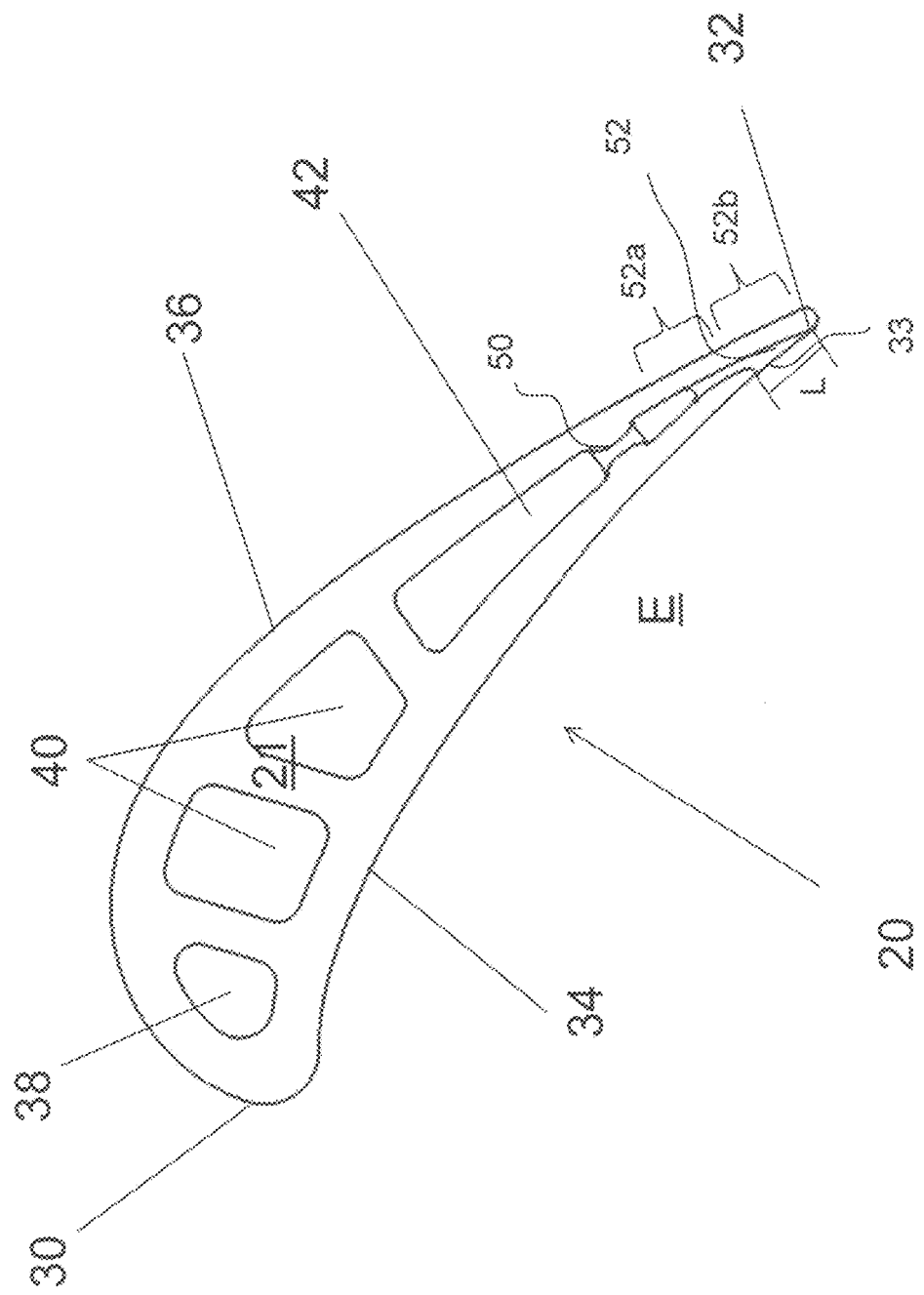
FIG. 3 is a schematic cross-sectional view of the blade of FIG. 2.

Turning to FIGS. 2 to 4, each of the blades 20 includes a root 22 connected to a hub (not shown) of the rotor, an airfoil 24 extending radially outwardly from a platform 23, and a tip 28 at an end of the airfoil 24 opposite to the root 22. The root 22 and the tip 28 defining between them a span S direction. The span S extends in the radial direction R. The airfoil 24 extends between a leading edge 30 and a trailing edge 32 disposed downstream of the leading edge 30. The leading edge 30 and the trailing edge 32 defining between them a chord Ch direction. The airfoil 24 includes a pressure side 34 (FIG. 3) and a suction side 36 (FIG. 3). As best seen in FIG. 3, the airfoil 24 is hollow to accommodate coolant air. An interior 21 of the airfoil 24 defined a plurality of chambers extending along the span S of the airfoil 24. As best shown in FIG. 3, the interior 21 of the non-limiting example of airfoil 24 described herein, includes a first chamber 38 towards the leading edge 30, second and third chambers 40 downstream of the first chamber 38, and a fourth or exit chamber 42 downstream of the second and third chambers 40 and communicating with the trailing edge 32. As best shown in FIG. 2, the chambers 40 and 42 are in fluid communication at connecting areas disposed toward the root 22 or the tip 28 of the blade 20 so as to create a span-wide serpentine path of coolant air (see arrows 44 in FIG. 2) within the blade 20 and thereby maximise cooling of the blade 20. The exit chamber 42 is in fluid communication with an exterior of the blade 20 to release the coolant air after it has cooled the blade 20 from the leading edge 30 to the trailing edge 32. The trailing edge 32 includes an outlet which may comprise a cut back 33 (shown in FIG. 3) in the pressure side 34 relative to the suction side 36 at the trailing edge 32. The cut-back 33 has a length L. It is also possible for the pressure side wall to extended up to the trailing edge extremity, so that the length L is zero.

The exit chamber 42 tapers toward the trailing edge 32 in a manner substantially similar to that of the airfoil 24. The exit chamber 42 includes an upstream portion 46 which may be devoid of cooling structures or heat exchange promoting structures and a downstream portion 48 with cooling structures. In the non-limiting embodiment shown in FIGS. 2 to 4, the cooling structures includes a distribution of cross-over openings 54 and a distribution of lands 52 disposed downstream of the cross-over wall 50 extending to the trailing edge 32. The distributions of cross-over openings 54 and of lands 52 are each disposed in the span S direction of the airfoil 24. While the cross-over wall 50 and the distribution of lands 52 are shown extending from the platform 23 to the tip 28 of the airfoil 24, it is contemplated that the cross-over wall 50 and the distribution of lands 52 could extend only along a portion of the span S of the airfoil 24.

Referring more specifically to FIG. 4, the cross-over wall 50 is disposed within the interior 21 of the airfoil 24. The cross-over openings 54 may be generally circular. The cross-over openings 54 are disposed so as to be generally aligned with trailing edge lands 52 in the chord Ch direction to favor cooling of the blade 20.

The lands 52 have a portion 52a disposed within the interior 21 of the blade 20, and a portion 52b in contact with the exterior E of the blade 20 (shown in FIG. 3). The lands 52 may be rounded at the portion 52a and tapered at the portion 52b toward the trailing edge 32. The portion 52b in contact with the exterior 23 is the portion shown of the cut-back 33 and has the length L. The portion 52b may be in contact with the hot gases from the combustor 16. As will be detailed below, the portions 52a which are inside the airfoil 24 are shaped to favour cooling of the blade 20. Each of the lands 52 has a width W. The width W may be defined as the widest portion, in the span S direction, of the portion of the land 52a within the airfoil 24. Adjacent lands 52 within the distribution of lands 52 are spaced by the channels 56. The channels 56 flare outwardly toward the trailing edge 32. The channels 56 have a pitch P. The pitch P may be defined as a distance, in the span S direction, between centerlines C of two adjacent lands 52. In the configuration of lands 52 shown herein, the pitch P is constant along the distribution of lands 52. It is contemplated that the lands 52 could have various shapes. For example, the lands 52 could have a flat portion upstream of the tapering toward the trailing edge 32. It is contemplated that the cross-over walls 50 and lands 52 could have various shapes. For example, the cross-over openings 54 could be tapered toward the trailing edge 32 similarly to the lands 52. In another example, the lands 52 could have a flat portion upstream of the tapering toward the trailing edge 32. It is contemplated that the downstream portion 48 of the exit chamber 42 could have cooling structures different from shown herein. For example, the cross-over walls 50 could be omitted. In another example, there could be two cross-over walls 50. Trip strips and pin fins could also be provided within the cooling passages.

During operation, some sections of the blades 20 are exposed to higher temperatures than other portions of the blades 20. Over time, such temperature differences and thermal strain may induce thermal stresses in the blades 20. In turn, the thermal strains may lead to thermal deformations to the airfoil, for example, local creep deflection, and may cause other problems such as airfoil low-cycle fatigue, which may shorten the useful life of the rotor blade. A mid-span section 60 (shown in FIG. 2) of the airfoil 24 (i.e. a portion at mid-span between the root 22 and the tip 28) may be typically in contact with hotter gases than peripheral end sections 62 (shown in FIG. 2) of the airfoil 24. It is thus desirable to cool the mid-span section 60 of the airfoil 24 more than adjacent sections 62 which are disposed toward the platform 23 and the tip 28. The lands 52 are designed to provide more cooling at the mid-span section 60 relative to the peripheral sections 62. In particular, the lands 52 in the mid-span section 60 have a width W1 narrower than a width W2 of the lands 52 in the peripheral sections 62. A narrower width would result in a larger channel 56 between adjacent lands and increased cooling. The variation in width W along the distribution of the lands 52 in the span S direction allows modulating the cooling while keeping the pitch P constant. Keeping a constant pitch P may allow to position the cross-over openings 54 in front of the channels 56 more easily than configurations having a variable pitch.

There may be a multiple of configurations of the widths W of the lands 52 based on the cooling requirements. In the non-limiting example shown herein, there are two widths W1, W2. There could be more than two widths involved in the configuration of the lands 52. For example, there could be five widths involved, thereby creating five sections of the airfoil 24. The widths W could gradually narrow from the mid-span section 60 toward the outermost peripheral sections 62 such that the width W could uniformly decrease from the root 22 to a mid-span of the airfoil 24 and uniformly increase from the mid-span to the tip 28. The width of the lands 52 vary uniformly along the span between the root 22 and the tip 28 of the airfoil 24. It is also contemplated, that the widths W could not increase or decrease uniformly across the span S of the blade 20. In the non-limiting example shown herein, the peripheral section 62 toward the tip 28 has the same width W2 than the peripheral sections 62 toward the platform 23. It is contemplated that the peripheral section 62 toward the tip 26 could have a width different from that of the peripheral sections 62 toward the platform 23. While the non-limiting example shown herein shows three sections of the blade 20 (i.e. mid-span section 60 and two peripheral sections 62), it is contemplated that the blade 20 could have only two sections. While the lands 52 are shown herein to be disposed in the span S direction parallel to each other, it is contemplated that the lands 52 could not be parallel to each other and could be at an angle with one another. For example, the lands 52 could be disposed in a fan-like fashion.

In designing the lands 52 and the different widths W of the lands 52 given a constant pitch P, one may first determine a thermal distribution throughout the blade 20 and second determine a surface area of open flow at the trailing edge 32 for a constant thickness of the trailing edge 32. One may then determine a constant pitch P. The finer the pitch P, the better the cooling may be. However, manufacturability may limit the fineness of the pitch P. Given the pitch P, one may then deduce using the thermal distribution, the different widths W of the land 52 which will optimise the cooling of the blade 20.

The above description is meant to be exemplary only, and one skilled in the art will recognize that changes may be made to the embodiments described without departing from the scope of the invention disclosed. For instance, it is understood that the same principles could be applied to stator vanes or other types of internally cooled airfoils. Other modifications which fall within the scope of the present invention will be apparent to those skilled in the art, in light of a review of this disclosure, and such modifications are intended to fall within the appended claims.

The invention claimed is:

1. An internally cooled airfoil for a gas turbine engine, comprising:
   an airfoil section extending in a span direction between a tip and a root, the airfoil section having:
      a leading edge and an opposed trailing edge defining a chord direction;

a pressure side and an opposed suction side, the pressure side and the suction side extending between the leading edge and the trailing edge, the pressure side and suction side defining a hollow interior of the airfoil, a plurality of trailing edge slots distributed along the spanwise direction, the trailing edge slot being in flow communication with the hollow interior of the airfoil, the trailing edge slots being spaced by lands, a width of each of the lands being a widest dimension in the span direction of the land, a pitch being a distance in the span direction between centerlines of two adjacent lands, the pitch being constant throughout the lands, the distribution of the lands including at least two different widths, wherein the at least two different widths of lands includes a first width narrower than a second width, the lands including a first group of lands having the first width and a second group of lands having the second width, the first group of lands being disposed about a mid-span of the airfoil, and the second group of lands being disposed toward one of the root and the tip of the airfoil.

2. The airfoil of claim 1, wherein the lands include a third group of lands having a third width greater than the first width, the third group of lands being disposed toward the other one of the root and the tip of the airfoil.

3. The airfoil of claim 2, wherein the third width and the second width are equal.

4. The airfoil of claim 1, wherein the lands include a rounded section and a tapering section downstream of the rounded section.

5. The airfoil of claim 1, wherein the lands are parallel to each other.

6. The airfoil of claim 1, further comprising a distribution of cross-over openings in the span direction, the cross-over openings being disposed upstream from and proximate to the lands.

7. The airfoil of claim 6, wherein the cross-over openings are aligned in the chord direction with the lands.

8. The airfoil of claim 6, wherein the cross-over openings are generally rounded.

9. The airfoil of claim 1, wherein the widths of the lands decreases from the root of the airfoil section to a mid-span of the airfoil section and increases from the mid-span of the airfoil section to a tip of the airfoil section.

10. The airfoil of claim 1, wherein the widths of the lands vary uniformly from the root of the airfoil section to the tip of the airfoil section.

11. The airfoil of claim 1, wherein the portion contained within the interior of the airfoil is a first portion, and the lands have a second portion downstream of the first portion, the second portion being exposed to the exterior of the airfoil.

12. The airfoil of claim 1, wherein the pressure side has a cut-back relative to the suction side at the trailing edge, the cut-back fluidly communicating with the interior of the airfoil, the lands having a portion contained within the interior of the airfoil.

13. A turbine blade for a gas turbine engine, the blade comprising:
 an airfoil extending from a platform to a tip along a span direction, the airfoil having:
  a leading edge and an opposed trailing edge defining a chord direction;
  a pressure side and an opposed suction side, the pressure side and the suction side extending between the leading edge and the trailing edge, the pressure side and suction side defining a hollow interior of the airfoil, a row of trailing edge slots distributed along the span direction of the airfoil, the trailing edge slots communicating with the hollow interior of the airfoil, wherein adjacent trailing edge slots are separated by lands, a width of each of the lands being a widest dimension in the span direction of the land, a pitch being a distance in the span direction between centerlines of two adjacent lands, the pitch being constant throughout the distribution of the lands, the distribution of the lands including at least two different widths, wherein the at least two different widths of lands includes a first width narrower than a second width, the lands including a first group of lands having the first width and a second group of lands having the second width, the first group of lands being disposed about a mid-span of the airfoil, and the second group of lands being disposed toward one of the platform root and the tip of the airfoil.

14. The blade of claim 13, wherein the pressure side has a cut-back relative to the suction side at the trailing edge, the cut-back fluidly communicating with the interior of the airfoil, the lands having a portion contained within the interior of the airfoil, the width of each of the lands being a widest dimension in the span direction of the land in the interior of the airfoil.

15. The blade of claim 13, wherein the lands include a third group of lands having a third width greater than the first width, the third group of lands being disposed toward the other one of the root and the tip of the airfoil.

16. The blade of claim 15, wherein the third width is equal to the second width.

17. The blade of claim 13, wherein the lands include a rounded section and a tapering section downstream of the rounded section.

18. The blade of claim 13, further comprising a distribution of cross-over openings in the span direction, the cross-over openings being disposed upstream from and proximate to the radial distribution of the lands, and wherein the cross-over openings are aligned in the chord direction with the trailing edge lands.

19. An internally cooled airfoil for a gas turbine engine, comprising:
 an airfoil section extending in a span direction between a tip and a root, the airfoil section having:
  a leading edge and an opposed trailing edge defining a chord direction;
  a pressure side and an opposed suction side, the pressure side and the suction side extending between the leading edge and the trailing edge, the pressure side and suction side defining a hollow interior of the airfoil, a plurality of trailing edge slots distributed along the spanwise direction, the trailing edge slot being in flow communication with the hollow interior of the airfoil, the trailing edge slots being spaced by lands, a width of each of the lands being a widest dimension in the span direction of the land, a pitch being a distance in the span direction between centerlines of two adjacent lands, the pitch being constant throughout the lands, the distribution of the lands including at least two different widths, wherein the widths of the lands decreases from the root of the airfoil section to a mid-span of the airfoil section and increases from the mid-span of the airfoil section to a tip of the airfoil section.

20. An internally cooled airfoil for a gas turbine engine, comprising:

an airfoil section extending in a span direction between a tip and a root, the airfoil section having:
  a leading edge and an opposed trailing edge defining a chord direction;
  a pressure side and an opposed suction side, the pressure side and the suction side extending between the leading edge and the trailing edge, the pressure side and suction side defining a hollow interior of the airfoil, a plurality of trailing edge slots distributed along the spanwise direction, the trailing edge slot being in flow communication with the hollow interior of the airfoil, the trailing edge slots being spaced by lands, a width of each of the lands being a widest dimension in the span direction of the land, a pitch being a distance in the span direction between centerlines of two adjacent lands, the pitch being constant throughout the lands, the distribution of the lands including at least two different widths, wherein the widths of the lands vary uniformly from the root of the airfoil section to the tip of the airfoil section.

* * * * *